United States Patent
Johnson

(10) Patent No.: US 12,210,973 B2
(45) Date of Patent: Jan. 28, 2025

(54) COMPRESSING NEURAL NETWORKS FOR NATURAL LANGUAGE UNDERSTANDING

(71) Applicant: Oracle International Corporation, Redwood Shores, CA (US)

(72) Inventor: Mark Edward Johnson, Sydney (AU)

(73) Assignee: Oracle International Corporation, Redwood Shores, CA (US)

(*) Notice: Subject to any disclaimer, the term of this patent is extended or adjusted under 35 U.S.C. 154(b) by 927 days.

(21) Appl. No.: 16/938,098

(22) Filed: Jul. 24, 2020

(65) Prior Publication Data

US 2021/0081799 A1 Mar. 18, 2021

Related U.S. Application Data

(60) Provisional application No. 62/899,650, filed on Sep. 12, 2019.

(51) Int. Cl.
| | |
|---|---|
| *G06N 3/082* | (2023.01) |
| *G06F 40/205* | (2020.01) |
| *G06F 40/295* | (2020.01) |
| *G06F 40/30* | (2020.01) |
| *G06N 3/045* | (2023.01) |

(52) U.S. Cl.
CPC ........... *G06N 3/082* (2013.01); *G06F 40/205* (2020.01); *G06F 40/295* (2020.01); *G06F 40/30* (2020.01); *G06N 3/045* (2023.01)

(58) Field of Classification Search
CPC ........ G06N 3/082; G06N 3/045; G06N 3/096; G06F 40/205; G06F 40/295; G06F 40/30
See application file for complete search history.

(56) References Cited

U.S. PATENT DOCUMENTS

| | | | |
|---|---|---|---|
| 2019/0180175 A1* | 6/2019 | Meteer | G10L 15/26 |
| 2019/0197119 A1 | 6/2019 | Zhang et al. | |
| 2019/0205748 A1* | 7/2019 | Fukuda | G06N 3/044 |
| 2019/0228763 A1* | 7/2019 | Czarnowski | G06N 3/04 |
| 2020/0042596 A1* | 2/2020 | Ravi | G06N 3/063 |
| 2020/0125927 A1* | 4/2020 | Kim | G06N 3/045 |

(Continued)

FOREIGN PATENT DOCUMENTS

| | | |
|---|---|---|
| CN | 106875940 A | 6/2017 |
| CN | 109993300 A | 7/2019 |
| WO | 2018126213 A1 | 7/2018 |

OTHER PUBLICATIONS

Ter-Sarkisov et al., "Incremental Adaptation Strategies for Neural Network Language Models," arXiv:1412.6650v4 [cs.NE] Jul. 7, 2015 (Year: 2015).*

(Continued)

*Primary Examiner* — Shane D Woolwine
*Assistant Examiner* — Yao David Huang
(74) *Attorney, Agent, or Firm* — Kilpatrick Townsend & Stockton LLP

(57) ABSTRACT

A model for a natural language understanding task is generated based on labeled data generated by a labeling model. The model for the natural language understanding task is smaller than the labeling model (i.e., with lower computational and memory requirements than the combined model), but with substantially the same performance as the labeling model. In some cases, the labeling model may be generated based on a large pre-trained model.

15 Claims, 7 Drawing Sheets

(56) References Cited

U.S. PATENT DOCUMENTS

2021/0319554 A1* 10/2021 Yu .................... G06T 7/0012

OTHER PUBLICATIONS

Ba et al., "Do Deep Nets Really Need to be Deep?," Advances in Neural Information Processing Systems 27 (NIPS 2014) (Year: 2014).*

Zhang et al., "Improving Clinical Named-Entity Recognition with Transfer Learning" in E. Cummings et al. (Eds.), Connecting the System to Enhance the Practitioner and Consumer Experience in Healthcare, 2018 (Year: 2018).*

Ziegler et al., "Encoder-Agnostic Adaptation for Conditional Language Generation," arXiv:1908.06938v1 [cs.CL] Aug. 19, 2019 (Year: 2019).*

Chronopoulou et al., "An Embarrassingly Simple Approach for Transfer Learning from Pretrained Language Models," arXiv:1902.10547v3 [cs.CL] May 31, 2019 (Year: 2019).*

"Mean Absolute Error", Encyclopedia of Machine Learning, 2011, 1 page.

Bromley et al., "Signature Verification using a "Siamese" Time Delay Neural Network", Proceedings of the 6th International Conference on Neural Information Processing Systems, Nov. 1994, pp. 737-744.

Bucila et al., "Model Compression", Proceedings of the 12th Association for Computing Machinery Special Interest Group on Knowledge Discovery and Data Mining International Conference on Knowledge Discovery and Data Mining, Aug. 20-23, 2006, pp. 535-541.

Cheng et al., "Building a Neural Semantic Parser from a Domain Ontology", Computer Science, Dec. 25, 2018, 38 pages.

Devlin et al., "Bert: Pre-Training of Deep Bidirectional Transformers for Language Understanding", Available Online at: https://arxiv.org/pdf/1810.04805.pdf, May 24, 2019, 16 pages.

Dong et al., "Language to Logical Form with Neural Attention", Proceedings of the 54th Annual Meeting of the Association for Computational Linguistics, vol. 1, Aug. 2016, pp. 33-43.

Hinton et al., "Distilling the Knowledge in a Neural Network", Conference on Neural Information Processing Systems Deep Learning and Representation Learning Workshop, Mar. 9, 2015, 9 pages.

Jia et al., "Data Recombination for Neural Semantic Parsing", Proceedings of the 54th Annual Meeting of the Association for Computational Linguistics, vol. 1, Aug. 2016, 11 pages.

Nielson , "3.1: The Cross-entropy Cost Function", Available Online at: https://eng.libretexts.org/@go/page/3752, Jul. 20, 2020, 12 pages.

Peters et al., "Deep Contextualized Word Representations", Proceedings of the 2018 Conference of the North American Chapter of the Association for Computational Linguistics: Human Language Technologies, vol. 1, Jun. 2018, pp. 2227-2237.

Wong et al., "Learning for Semantic Parsing with Statistical Machine Translation", Proceedings of the Human Language Technology Conference of the North American Chapter of the Association for Computational Linguistics, Jun. 2006, pp. 439-446.

Zhou et al., "Ensembling Neural Networks: Many Could Be Better Than All", Artificial intelligence, vol. 137, No. 1-2, May 2002, pp. 239-263.

International Application No. CN202010907744.7, "Office Action", mailed Aug. 5, 2024, 6 pages.

* cited by examiner

COMPRESSING NEURAL NETWORKS FOR NATURAL LANGUAGE UNDERSTANDING

CROSS-REFERENCE TO RELATED APPLICATIONS

The present application claims the benefit and priority under 35 U.S.C. 119(e) of U.S. Application No. 62/899,650, filed on Sep. 12, 2019, entitled "COMPRESSING RECURRENT NEURAL NETWORKS USED IN NATURAL LANGUAGE UNDERSTANDING," the content of which is herein incorporated by reference in its entirety for all purposes.

TECHNICAL FIELD

The present disclosure relates generally to dialog systems and machine learning. More specifically, but not by way of limitation, this disclosure describes techniques for using a relatively large model to generate a large amount of labeled conversational data used to train a relatively small model for performing a natural language understanding task.

BACKGROUND

An increasing number of devices now enable users to interact with the devices directly using voice or spoken speech. For example, a user can speak to such a device in a natural language where the user may ask a question or make a statement requesting some action to be performed. In response, the device performs the requested action or responds to the user's question using voice output. Since interacting directly using voice is a more natural and intuitive way for humans to communicate with their surroundings, the popularity of such speech-based systems is growing at an astronomical rate.

The ability to interact with a device using spoken speech is facilitated by a dialog system (also sometime referred to as a chatbot or a digital assistant), which may be in the device. A dialog system typically uses machine learning models to perform a series of dialog processing tasks. Dialog processing models are often large, complex models. Such complex models are commonly slow to execute at runtime and can be extremely large (e.g., a pre-trained model can require a large amount of storage and processing resources, sometimes to the extent that such models must be housed on a supercomputer or multiple servers). This makes it difficult for such dialog systems to be incorporated into low-power and resource-deficient devices such as kitchen appliances, lights, etc.

BRIEF SUMMARY

The present disclosure relates generally to natural language understanding. More particularly, techniques are described for compressing recurrent neural networks for use in a natural language understanding tasks. Various embodiments are described herein, including methods, systems, non-transitory computer-readable storage media storing programs, code, or instructions executable by one or more processors, and the like.

In certain embodiments, a method for training a neural network to perform a natural language understanding task includes obtaining first labeled conversational data, training a first neural network using the first labeled conversational data, obtaining first unlabeled conversational data, executing the trained first neural network on the first unlabeled conversational data to label the first unlabeled conversational data, thereby generating second labeled conversational data, and training a second neural network for performing a natural language understanding task using the second labeled conversational data.

In some aspects, prior to training the first neural network, the method further includes obtaining second unlabeled conversational data, training a third neural network to perform a proxy task using the second unlabeled conversational data, and generating the first neural network based on the third neural network. In some aspects, generating the first neural network based on the third neural network comprises constructing the first neural network to include at least a portion of the third neural network. In some aspects, the third neural network is a component of the first neural network. In some aspects, the proxy task comprises a predictive language task.

In some aspects, the natural language understanding task comprises one or more of semantic parsing, intent classification, or named entity classification. In some aspects, training the second neural network comprises, for a first training input, of the second labeled conversational data, outputting by the second neural network a predicted output, computing a loss measuring an error between the predicted output and a first label associated with the first training input, computing, based upon the loss, updated values for a first set of parameters of the second neural network, and updating the second neural network by changing values of the first set of parameters to the updated values.

Embodiments further include systems and computer-readable memories configured for performing the methods described herein.

The foregoing, together with other features and embodiments will become more apparent upon referring to the following specification, claims, and accompanying drawings.

DETAILED DESCRIPTION

Figure 1:
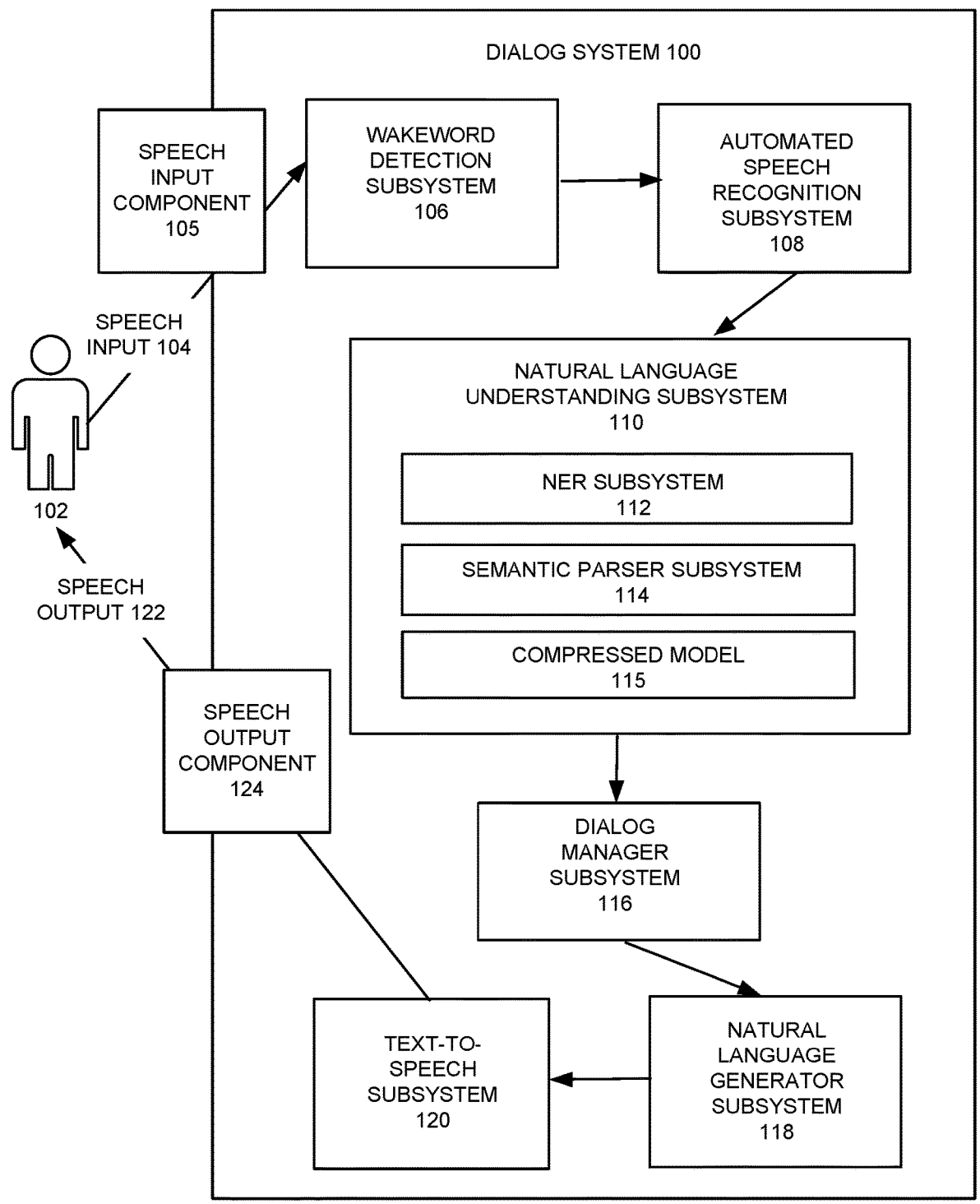
FIG. 1 is a simplified block diagram illustrating a dialog system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as exemplary is not necessarily to be construed as preferred or advantageous over other embodiments or designs.

A voice-enabled system that is capable of having a dialog with a user via voice inputs and voice outputs can come in various forms. For example, such a system may be provided as a stand-alone device, as a digital or virtual assistant, as a voice-capable service, and the like. In each of these forms, the system is capable of receiving voice or speech inputs, understanding the inputs, generating responses or taking actions responsive to the inputs, and outputting the responses using voice outputs. In certain embodiments, the dialog functionality in such a voice-enabled system is provided by a dialog system or infrastructure ("dialog system"). Various terms are used to refer to such a dialog system, such as a chatbot or chatbot system, a digital assistant, and the like.

A dialog system may operate using a combination of processes. Such processes may include natural language understanding (NLU), which can be used to process a text utterance to generate a meaning representation. Natural language understanding tasks include tasks that convert speech data (e.g., a text utterance) into data suitable for computer processing. Natural language understanding tasks include semantic parsing, named entity recognition and classification, slot filling, part-of-speech tagging, sentiment analysis, word sense disambiguation, lemmatization, word segmentation, and sentence bounding detection, among other tasks.

As noted above, machine learning models used for dialog processing tasks are often large or complex models. In general, more complex models are more capable than simpler models, as they can understand more complicated language, and can respond in a more complex fashion. But complex models also are much larger and use more computational resources at runtime, compared to a simpler model. While it is desirable to perform dialog processing tasks on a small embedded device, it simply might not be feasible to have complex models running on such a small device.

In some embodiments, a machine learning model for performing a natural language processing task in a dialog system is "compressed" to create a "compressed model," which may be small enough in terms of storage and processing requirements to execute on an embedded device. A first machine learning model is trained from labeled training data. In some embodiments, this first machine learning model is a neural network ("first neural network," also referred to as a "labeling model"). This labeling model is then used a teacher to train a simpler, faster model. The simpler, faster model may be a neural network of smaller profile which is ultimately used at runtime ("second neural network," also referred to herein as a "compressed model"). Compressing the model in this way reduces the size of the model and the amount of computing power needed to execute the model, as well as the memory needed to store the model.

In some embodiments, deep learning neural network models may be used. Typically, the complexity of such models characterized by number of layers in the neural network and the number of nodes in the neural network. These pre-trained models might have 12 or 24 layers and each layer may have millions of nodes in it. A simpler model may have 2 or 3 layers with hundreds or thousands of nodes each, and may be an order of magnitude or more smaller than a pre-trained model.

In some embodiments, the labeling model is trained with labeled training data to make predictions. These predictions can be used to generate a huge amount of labeled data, which can be used to create the compressed model. Whereas the complex labeling model can be trained on a relatively small corpus of data, the simpler compressed model may require a lot more data to get to that same quality level. Accordingly, the labeling model can be used to generate a large amount of labeled training data, to teach the compressed model to perform a natural language understanding task, effectively transferring the knowledge of the complex labeling model to the smaller compressed model. As an example, the dialog system may have access to a large amount of call logs (e.g., unlabeled data). The labeling model can be used to label the unlabeled call log data, and use that to train the compressed model.

The compressed model may be compressed to fit within certain constraints. For example, to use natural language understanding in an alarm clock, the chips would have certain memory and speed requirements on them. The compressed model may be tailored to such a hardware requirement. The compressed model for the natural language understanding task is smaller than the labeling model (i.e., with lower computational and memory requirements than the labeling model), but with substantially the same performance as the labeling model.

In some embodiments, the labeling model may itself be generated based on another model. The model used to generate the labeling model may be trained to perform a proxy task related to the ultimate task to be performed. This process is called pre-training. For example, a very large "proxy model" may be trained to predict the next word in the sentence or next sentence in a text. This model is then used to generate the labeling model, which is trained to make a related prediction (e.g., for semantic parsing or sentiment analysis). This can result in a labeling model with quite improved performance over a basic model that was not generated with any pre-training. Pre-trained models are very useful for tasks such as natural language processing, as these models can be trained on a huge dataset and learn a very large vocabulary. However, such models tend to be very large and slow to use, as a pre-trained model incorporates many different types of components. By using a pre-trained model with a great deal of built-in information, the complex labeling model can be trained on a relatively small corpus of labeled training data. By then compressing such a model or derivative thereof, a great amount of knowledge can be imparted onto the compact compressed model.

FIG. 1 illustrates an example of a dialog system 100, according to some embodiments. The dialog system 100 is configured to receive voice or speech inputs 104 (also referred to as speech utterances) from a user 102. The dialog system 100 may then interpret the voice inputs. The dialog system 100 may maintain a dialog with the user 102, and possibly perform or cause one or more actions to be performed based upon interpretations of the voice inputs. The dialog system 100 may prepare appropriate responses, and output the responses to the user using voice or speech output.

In certain embodiments, the processing performed by a dialog system is implemented by a pipeline of components or subsystems, including a speech input component 105, a wake-word detection (WD) subsystem 106, an automatic speech recognition (ASR) subsystem 108, an integrated shared dictionary 109, a natural language understanding (NLU) subsystem 110, which includes a named entity recognizer (NER) subsystem 112 and a semantic parser subsystem 114, a dialog manager (DM) subsystem 116, a natural language generator (NLG) subsystem 118, a text-to-speech (TTS) subsystem 120, and a speech output component 124. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

The speech input component 105 includes hardware and software configured to receive speech input 104. In some instances, the speech input component 105 may be part of the dialog system 100. In some other instances, the speech input component 105 may be separate from and communicatively coupled to the dialog system 100. The speech input component 105 may, for example, include a microphone coupled to software configured to digitize and transmit speech input to the wake-word detection subsystem 106.

The wake-word detection (WD) subsystem 106 is configured to listen for and monitor a stream of audio input for input corresponding to a special sound or word or set of words (referred to as a wake-word). Upon detecting the wake-word configured for the dialog system 100, the WD subsystem 106 is configured to activate the ASR subsystem 108. In certain implementations, a user may be provided the ability to activate or deactivate the WD subsystem 106 (e.g., by speaking the wake-word pushing a button). When activated (or operating in active mode), the WD subsystem 106 is configured to continuously receive an audio input stream, and process the audio input stream to identify audio or voice input corresponding to the wake-word. When audio input corresponding to the wake-word is detected, the WD subsystem 106 activates the ASR subsystem 108.

As described above, the WD subsystem 106 activates the ASR subsystem 108. In some implementations of the voice-enabled system, mechanisms other than wake-words may be used to trigger or activate the ASR subsystem 108. For example, in some implementations, a push button on a device may be used to trigger the ASR subsystem 108 processing without needing a wake-word. In such implementations, the WD subsystem 106 may not be provided. When the push button is pressed or activated, the speech input received after the button activation is provided to the ASR subsystem 108 for processing. In some implementations, the ASR subsystem 108 may be activated upon receiving an input to be processed.

The ASR subsystem 108 is configured to receive and monitor spoken voice input after a trigger or wake-up signal (e.g., the wake-up signal may be sent by the WD subsystem 106 upon the detection of a wake-word in the speech input, the wake-up signal may be received upon the activation of a button, etc.) and to convert the voice input to text. As part of its processing, the ASR subsystem 108 performs speech-to-text conversion. The spoken speech or voice input may be in a natural language form, and the ASR subsystem 108 is configured to generate the corresponding natural language text in the language of the speech input. The text generated by the ASR subsystem is then fed to the NLU subsystem 110 for further processing. The voice input received by the ASR subsystem 108 may include one or more words, phrases, clauses, sentences, questions, etc. The ASR subsystem 108 is configured to generate a text utterance for each spoken clause and feed the text utterances to the NLU subsystem 110 for further processing.

The NLU subsystem 110 receives texts generated by the ASR subsystem 108. The texts received by the NLU subsystem 110 from the ASR subsystem 108 may include text utterances corresponding to spoken words, phrases, clauses, etc. The NLU subsystem 110 translates each text utterance (or a series of text utterances) to its corresponding logical form. The NLU subsystem 110 may further use information passed from the ASR subsystem 108 to rapidly obtain information from the integrated shared dictionary 109 for use in generating the logical form, as described herein.

In certain implementations, the NLU subsystem 110 includes a named entity recognizer (NER) subsystem 112 and a semantic parser (SP) subsystem 114. The NER subsystem 112 receives a text utterance as input, identifies named entities in the text utterance, and tags the text utterance with information related to the identified named entities. The tagged text utterances are then fed to the SP subsystem 114, which is configured to generate a logical form for each tagged text utterance (or for a series of tagged text utterances). The logical form generated for an utterance may identify one or more intents corresponding to the text utterance. An intent for an utterance identifies an objective of the utterance. Examples of intents include "order pizza" and "find directions." An intent may, for example, identify an action that is requested to be performed. In addition to intents, a logical form generated for a text utterance may also identify slots (also referred to as parameters or arguments) for the identified intent. For example, for the speech input "I'd like to order a large pepperoni pizza with mushrooms and olives," the NLU subsystem 110 can identify the intent order pizza. The NLU subsystem can also identify and fill slots, e.g., pizza_size (filled with large) and pizza_toppings (filled with mushrooms and olives). The NLU subsystem may use machine learning based techniques, rules (which may be domain specific), or a combination of the two, to generate the logical forms. The logical forms generated by the NLU subsystem 110 are then fed to the DM subsystem 116 for further processing.

In some embodiments, the NLU subsystem 110 includes a compressed model 115. The compressed model 115 is a relatively small model for performing a natural language understanding task that has been compressed using the techniques described herein. In some embodiments, the compressed model 115 is a neural network. The compressed model 115 may be a semantic parser (e.g., part of semantic parser subsystem 114). Alternatively, or additionally, the compressed model may be a named entity recognizer (e.g., part of NER subsystem 112). Alternatively, or additionally, compressed model 115 may be a separate subsystem for performing a natural language understanding task such as slot filling, part-of-speech tagging, sentiment analysis, word sense disambiguation, and so forth. Techniques for generating a compressed model 115 are described in further detail below with respect to FIGS. 2-4.

The DM subsystem 116 is configured to manage a dialog with the user based upon logical forms received from the NLU subsystem 110. As part of the dialog management, the DM subsystem 116 is configured to track dialog states, initiate the execution of or itself execute one of more actions or tasks, and determine how to interact with the user. These actions may include, for example, querying one or more databases, producing execution results, and other actions. For example, the DM subsystem 116 is configured to interpret the intents identified in the logical forms received from the NLU subsystem 110. Based upon the interpretations, the DM subsystem 116 may initiate one or more actions that it interprets as being requested by the voice inputs provided by the user. In certain embodiments, the DM subsystem 116 performs dialog states tracking based upon current and past voice inputs and based upon a set of rules (e.g., dialog policies) configured for the DM subsystem 116. These rules may specify the different dialog states, conditions for transitions between states, actions to be performed when in a particular state, and the like. These rules may be domain specific. In certain embodiments machine learning based techniques (e.g., machine learning models) may also be used. In some embodiments, a combination of rules and machine learning models may be used. The DM subsystem 116 also generates responses to be communicated back to the user involved in the dialog. These responses may be based upon actions initiated by the DM subsystem 116 and their results. The responses generated by the DM subsystem 116 are fed to the NLG subsystem 118 for further processing.

The NLG subsystem 118 is configured to generate natural language texts corresponding to the responses generated by the DM subsystem 116. The texts may be generated in a form that enables them to be converted to speech by the TTS subsystem 120. The TTS subsystem 120 receives the texts from the NLG subsystem 118 and converts each of them to speech or voice audio, which may then be output to the user via an audio or speech output component 124 of the dialog system (e.g., a speaker, or communication channel coupled to an external speaker). In some instances, the speech output component 124 may be part of the dialog system 100. In some other instances, the speech output component 124 may be separate from and communicatively coupled to the dialog system 100.

As described above, the various subsystems of the dialog system 100 working in cooperation provide the functionality that enables the dialog system 100 to receive speech inputs 104 and respond using speech outputs 122 and maintain a dialog with a user using natural language speech. The various subsystems described above may be implemented using a single computer system or using multiple computer systems working cooperatively. For example, for a device implementing the voice-enabled system, the subsystems of the dialog system 100 described above may be implemented entirely on the device with which the user interacts. In some other implementations, some components or subsystems of the dialog system 100 may be implemented on the device with which the user interacts, while other components may be implemented remotely from the device, possibly on some other computing devices, platforms, or servers.

As described above, in certain embodiments, a dialog system 100 may be implemented using a pipeline of subsystems. In some embodiments, one or more of the subsystems may be combined into a single subsystem. In certain embodiments, the functionality provided by a particular subsystem may be provided by multiple subsystems. A particular subsystem may also be implemented using multiple subsystems.

In certain embodiments, machine learning techniques may be used to implement one or more functions of the dialog system 100. For example, supervised machine learning techniques such as those implemented using a neural network (e.g., a deep neural network) may be used to implement one or more functions of the dialog system 100. As one example, a neural network may be provided that is trained to perform ASR functions performed and such a trained model may be used by the ASR subsystem 108 for its processing. Such a neural network implementation may take the speech input as input and output a text utterance to the NLU subsystem. Machine learning based models may also be used by other subsystems of the dialog system 100.

Figure 2:
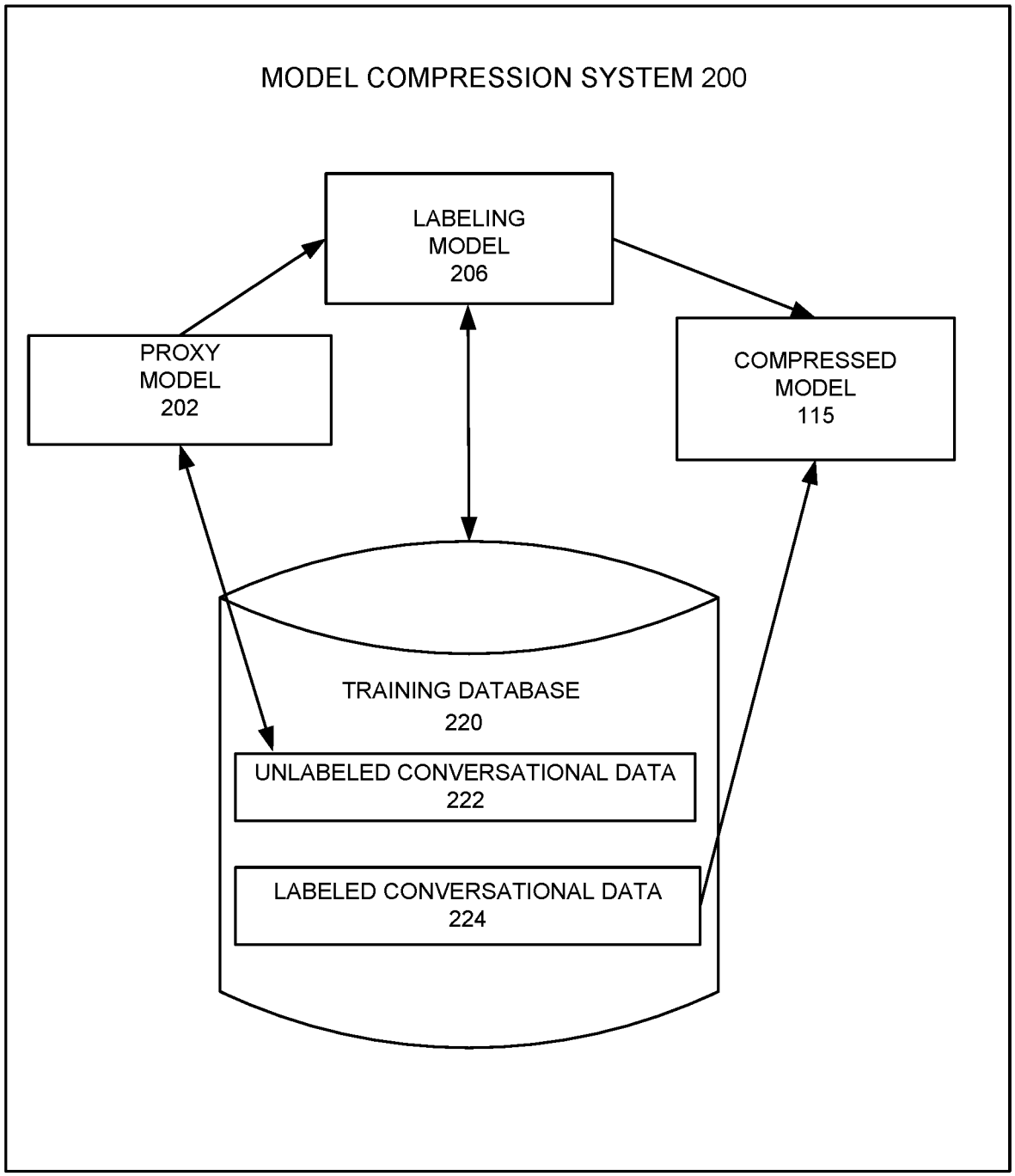
FIG. 2 is a simplified block diagram illustrating a model compression system according to certain embodiments.

FIG. 2 illustrates an example of a model compression system 200, according to some embodiments. The model compression system 200 is configured generate a compressed model 115 (e.g., the compressed model of 115 of dialog system 100 of FIG. 1) using a labeling model 206 as well as unlabeled conversational data 222 and labeled conversational data 224 in a training database 220. In some embodiments, a proxy model 202 is also used to generate the labeling model 206. In some implementations, the model compression system 200 is a subsystem of the dialog system 100. Alternatively, the model compression subsystem may be separate from the dialog system, and perform offline training and preparation of the compressed model 115 which is pushed to the dialog system 100 for execution. The subsystems listed above may be implemented only in software (e.g., using code, program, or instructions executable by one or more processors or cores), in hardware, or in a combination of hardware and software. In certain implementations, one or more of the subsystems may be combined into a single subsystem. Additionally or alternatively, in some implementations, the functions described herein as performed by a particular subsystem may be implemented by multiple subsystems.

In some embodiments, the training database 220 is a storage unit and/or device (e.g., a file system, database, collection of tables, or other storage mechanism) for storing training data. The training database 220 may include multiple different storage units and/or devices. The training database 220 may be local to the model compression system 200 (e.g., local storage) and/or connected to the model compression system 200 over a network (e.g., cloud storage).

In some embodiments, the training data stored to the training database 220 is for training the proxy model 202, labeling model 206, and/or compressed model 115. The training data comprises labeled conversational data 224 and unlabeled conversational data 222. The unlabeled conversational data 222 may include conversational data such as chat logs, phone records, transcripts of speeches or meetings, movie scripts, and the like. The unlabeled conversational data 222 may come from sources where large amounts of data are available. In some cases, the training database 220 may further store additional unlabeled data such as data obtained from corporate databases or the Internet (e.g., a set of Web pages from a scrape of the Web, online encyclopedias, and so forth). This can be used to enrich the training data even further. The labeled conversational data 224 is conversational data (e.g., call log data, etc.) which has been labeled or annotated for training one or more machine learning models. For example, labeled conversational data for training models to perform named entity classification are annotated such that named entities (e.g., John Goodman and Paris) are labeled with named entity types (e.g., Person and City).

In some embodiments, the labeling model 206 is a relatively large model for performing a natural language understanding task. In some implementations, the labeling model 206 is a neural network, and is referred to as a first neural network. For example, the labeling model 206 may be a recurrent neural network having 12 or 24 layers). The labeling model is trained for performing a natural language understanding task such as semantic parsing or named entity classification. The labeling model may be trained to perform a task that is ultimately desired to be performed, although the labeling model may not actually be used at runtime. The labeling model 206 is trained using all, or a subset of, the labeled conversational data 224.

The labeling model 206 is used to label all, or a subset of, the unlabeled conversational data 222 in the training database 220 to generate labeled conversational data 224. For example, for training models to perform semantic parsing, the labeling model 206 is executed to parse text clauses in the unlabeled conversational data 222 to generate a meaning representation. This meaning representation can be linked to a respective portion of the unlabeled data to generate labeled conversational data 224.

In some embodiments, the compressed model 115 is a relatively small model for performing a natural language understanding task. In some implementations, the compressed model 115 is a neural network, and is referred to as a second neural network. For example, the compressed model 115 may be a recurrent neural network having 2 or 4 layers. The compressed model 115 is trained for performing a natural language understanding task such as semantic parsing or named entity classification. The compressed model 115 may be trained to perform the same task that the labeling model 206 was trained to perform. The compressed model 115 is trained using the labeled conversational data 224 generated by the labeling model 206.

In some implementations, multiple training datasets are used to train multiple machine learning models that are used to generate the compressed model 115 for use at runtime. The training dataset used for training the labeling model 206 is referred to as first labeled conversational data, of the labeled conversational data 224. The labeling model 206 labels first unlabeled conversational data, of the unlabeled conversational data 222. By labeling the first unlabeled conversational data, the labeling model generates second labeled conversational data, of the labeled conversational data 224, which is used to train the compressed model 115. In some implementations, a third model, proxy model 202, is also used to generate the labeling model 206. This proxy model 202 may be trained on additional unlabeled data, which may include second unlabeled conversational data, of the unlabeled conversational data 222.

In some embodiments, the proxy model 202 is a large model for performing a natural language task (e.g., a pre-trained model). In some implementations, the proxy model 202 is a neural network, and is referred to as a third neural network. For example, the proxy model 202 may be a recurrent neural network having 24 or more layers. The proxy model 202 may be trained to perform a proxy task for which there is a very large amount of data available. For example, the proxy model 202 can be trained to predict a randomly-chosen word in a sentence from the web, given all the other words in the same sentence or paragraph that the word appears in. The proxy model 202 may be very large because it is trained on so much diverse data (e.g., with an extremely large vocabulary).

In some embodiments, the labeling model 206 is a combined model generated based on the proxy model 202. The use of the proxy model 202 is generating the labeling model 206 improves the accuracy of the predictions made by the labeling model 206 because it enables the labeling model 206 to generalize from the task-specific training data in a more reliable fashion.

Specific examples of large models for use as the proxy model 202 and/or the labeling model 206 include a bidirectional transformer model (e.g., Bidirectional Encoder Representations from Transformers (BERT)) and a of a deep bidirectional language model (e.g., Embeddings from Language Models (ELMo). BERT is a bidirectional transformer model that learns contextual relations between words, or parts of words, in text. (J. Devlin et al., *BERT: Pre-training of Deep Bidirectional Transformers for Language Understanding*, available at https://arxiv.org/pdf/1810.04805.pdf (2019)). ELMo is a deep contextualized word representation which uses a deep pre-trained neural network trained on a large data set. ELMo models characteristics of word use, such as syntax and semantics, as well as how word use varies across linguistic context. (M. Peters et al., *Deep Contextualized Word Representations*, available at https://arxiv.org/abs/1802.05365 (2017)).

Figure 3:
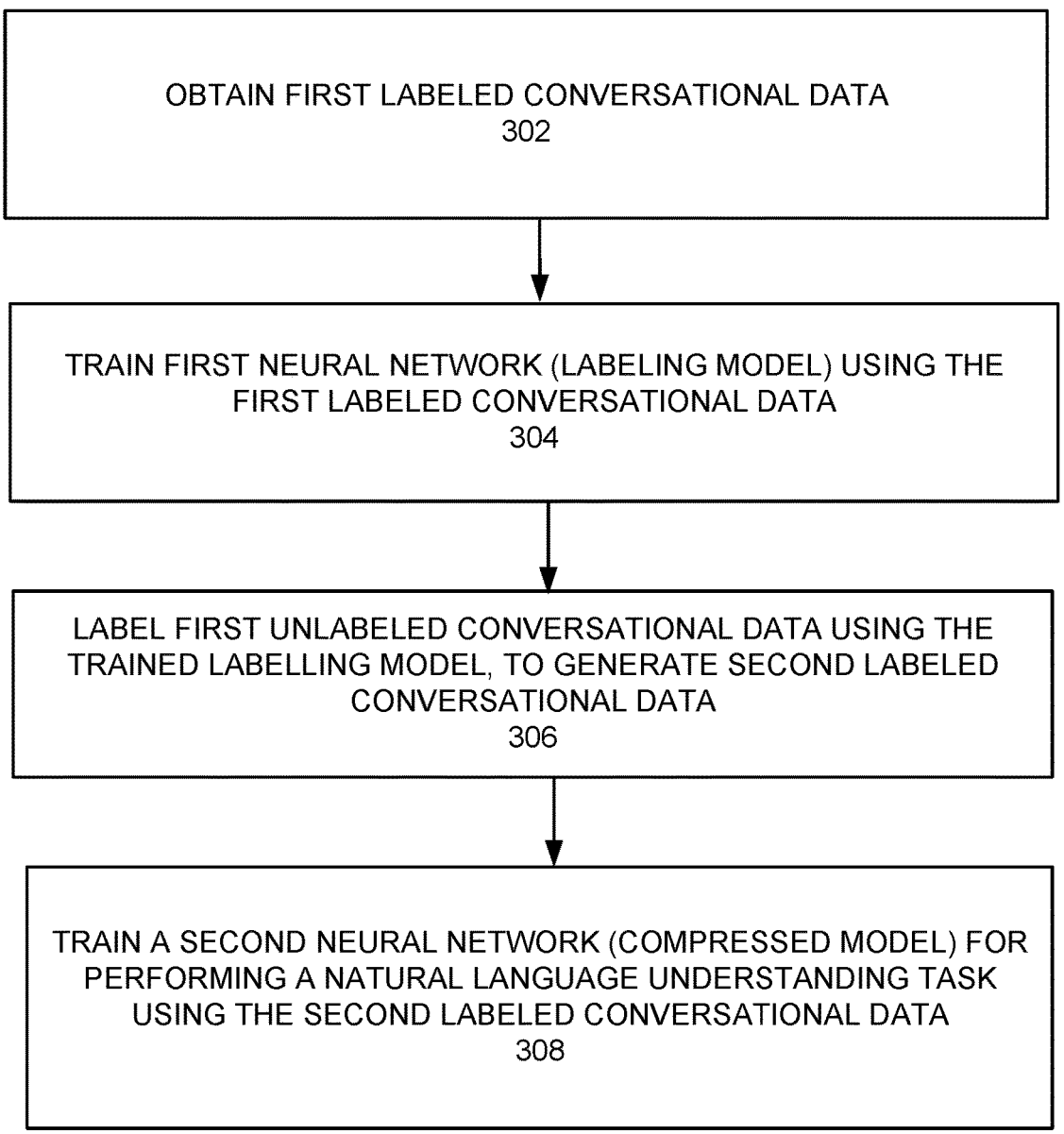
FIG. 3 is a flowchart illustrating a method for compressing neural networks for natural language understanding tasks according to certain embodiments.

FIG. 3 is a flowchart illustrating a method 300 for compressing neural networks for natural language understanding tasks according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 3 may be performed by the model compression system 200 of FIG. 2.

At 302, the model compression system obtains first labeled conversational data. At an initial time, the labeled conversational data may be manually or automatically annotated with data specific to the task desired (e.g., intents or named entities). The first labeled conversational data may be a small dataset or a large dataset. The model compression system may obtain the first labeled conversational data by downloading the data. Alternatively, or additionally, the first labeled conversational data may be generated and stored on the model compression system itself. As described above with respect to FIG. 2, the first labeled conversational data may originate from sources such as call center logs, chat logs, etc., and may be stored to the training database 220 of the model compression system 200.

At 304, the model compression system trains a labeling model using the first labeled conversational data. In some implementations, the labeling model is a neural network for performing a natural language understanding task (e.g., labeling model 206 of FIG. 2). The labeling model is also referred to herein as a first neural network, although it should be understood that, in some implementations, other types of machine learning models may be selected as the labeling model.

The model compression system may train the labeling model using labeled data appropriate for the natural language understanding task of interest (e.g., for semantic parsing, named entity classification, etc.). For example, the labeling model may be trained using conversational data which has been labeled with logical forms (e.g., a set of utterances labeled with corresponding logical forms). As another example the labeling model may be trained using conversational data which has been labeled with named entity types, such that the labeling model is trained to classify named entities. In some embodiments, training the labeling model includes use of a proxy model 202, which may be used in generating the labeling model, as described in further detail below with respect to FIG. 4.

In some embodiments, the labeling model is trained using loss minimization techniques. For example, the first labeled conversational data includes various training inputs. For a first training input, of the first labeled conversational data, the labeling model is executed and outputs a predicted output. As a specific example, the labeling model receives as input (e.g., to the first neural network) a sample utterance (e.g., "What country is Paris in?"). The labeling model is configured to performed named entity classification tasks, and outputs the predicted named entity for the sample utterance—Paris=City. The model compression system computes a loss measuring an error between the predicted output and a first label associated with the first training input (e.g., labeling the named entity type of Paris as City). Different types of loss functions may be suitable for different model architectures and end-goals. Loss functions include cross-entropy functions (see, e.g., Nielson, *Neural Networks and Deep Learning*, Ch. 3.2 (last updated July 2020)) and mean-absolute-error loss functions (see, e.g., Mean Absolute Error. in: Sammut C., Webb G.I. (eds) *Encyclopedia of Machine Learning*, Springer, Boston, MA (2011)). Using the loss computed, the model compression system may compute updated values for a first set of parameters of the labeling model. The labeling model is then updated by changing values of the first set of parameters to the updated values.

At 306, the dialog system labels first unlabeled conversational data using the trained labeling model to generate second labeled conversational data. The system may use the trained labeling model to label unlabeled conversational data. The unlabeled conversational data may, for example, include call logs, text chat logs, and the like. Other examples of unlabeled conversational data include emails and other written documents. Using the trained labeling model to label unlabeled data may include performing a natural language processing task using the trained labeling model. The input to the labeling model may include a particular conversational data element (e.g., the utterance "How do I get to the beach?"). The trained labeling model may perform a natural language task to output a value, and that value may be used to label the conversational data. Continuing with the above example, the trained labeling model has been trained to perform intent classification. The output of the trained labeling model for the input utterance "How do I get to the beach" is the intent Directions_To. The model compression system uses the intent Directions_To to label the utterance "How do I get to the beach?". The result is labeled training data—utterance: "How do I get to the beach?"+Intent: "Directions_To." This labeled training data ("second labeled conversational data") can be saved to the same dataset in the training database 220 that includes the first unlabeled conversational data used at 302, or to a different dataset in the training database 220.

At 308, the system trains a compressed model for a natural language understanding task using the second labeled conversational data. In some embodiments, the compressed model is a neural network (e.g., a second neural network). The compressed model is a significantly smaller model than the labeling model. The compressed model is trained to perform a natural language understanding task, which may be the same type of natural language understanding task that the labeling model has been trained to perform (e.g., named entity classification, semantic parsing, etc.). Because the compressed model is significantly smaller than the labeling model, the NLU model has significantly lower computational and memory requirements than the compressed model.

In some embodiments, the compressed model is trained using loss minimization techniques. This may be performed in a similar fashion as described above with respect to the training of the labeling model at 304. For a first training input, of the second labeled conversational data, the compressed model may be executed. The compressed model outputs a predicted output. The model compression system computes a loss measuring an error between the predicted output and a first label associated with the first training input. Using the loss computed, the model compression system may compute updated values for a first set of parameters of the compressed model. The compressed model is then updated by changing values of the first set of parameters to the updated values.

Figure 4:
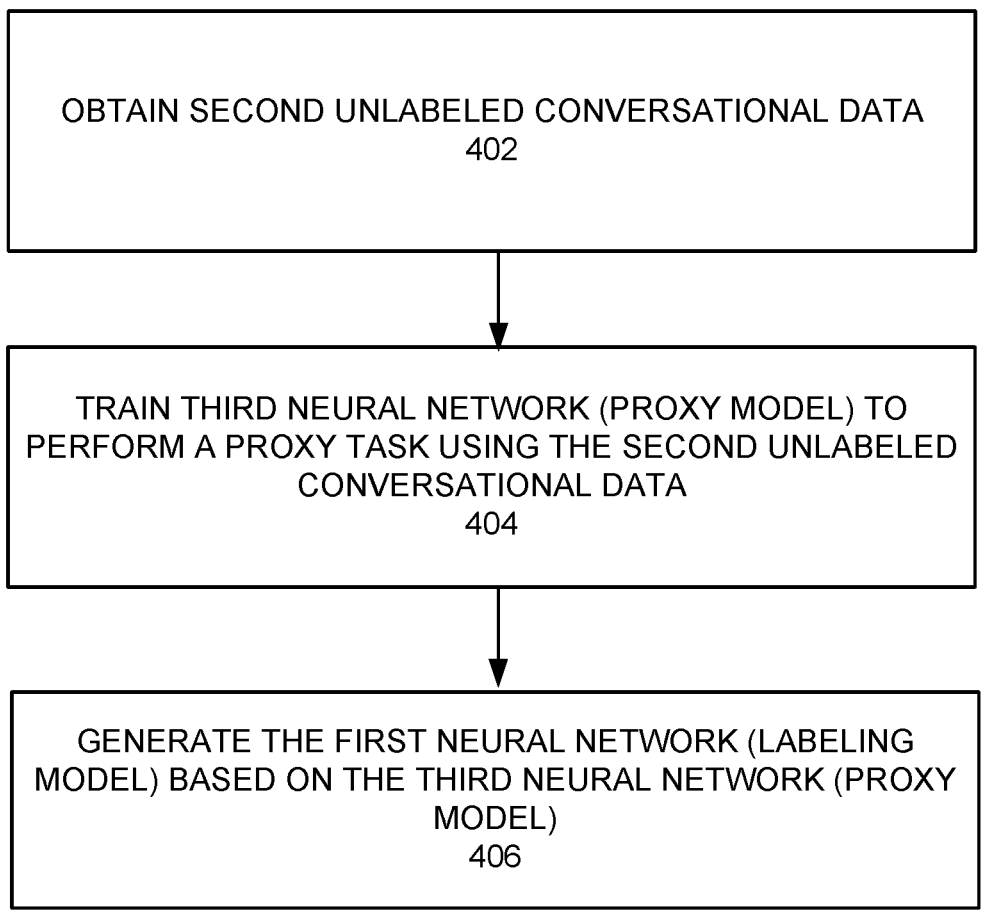
FIG. 4 is a flowchart illustrating additional techniques for compressing neural networks for natural language understanding tasks according to certain embodiments.

FIG. 4 illustrates steps for generating the labeling model of FIG. 3 based on a proxy model. In some embodiments, the processing of FIG. 4 may be performed initially to generate the labeling model of FIG. 3. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 4 may be performed by the model compression system 200 of FIG. 2. The processing of FIG. 4 may be performed as a prelude to the processing of FIG. 3.

At 402, the model compression system obtains second unlabeled conversational data. The second unlabeled conversational data may be a large data set such as a scrape of the Web, a large set of websites, and/or a large set of chat logs. The model compression system may obtain the second unlabeled conversational data by downloading the data to the training database 220. Alternatively, or additionally, the model compression system may remotely access the unlabeled conversational data (e.g., via API). In some cases, the second unlabeled conversational data is the same as the first unlabeled conversational data used in the processing of FIG. 3. Alternatively, in some embodiments, different datasets are used (e.g., the first unlabeled conversational data and the second unlabeled conversational data are different data sets). It may, for example, be suitable to use different data sets if the proxy model is to be trained on a very large unstructured dataset, whereas the first unlabeled conversational data to be labeled by the labeling model is a more moderately sized structured data set.

At 404, the model compression system trains a proxy model to perform a proxy task using the second unlabeled conversational data. In some embodiments, the proxy model is a neural network (e.g., a third neural network). In some implementations, the proxy model is a large pre-trained model such as BERT or ELMo. The proxy model is trained to perform a proxy task. The proxy task is a task that will teach the proxy model information that will be useful for training the labeling model and/or compressed model. For example, the labeling model used at blocks 304 and 306 of FIG. 3 is to be used for semantic parsing. The proxy model is trained to predict a next word in a sentence, so that the proxy model can learn to understand language while using a broad dataset. Accordingly, the proxy task may comprise a predictive language task. In some implementations, the labeling model may have the same or a very similar architecture to the proxy model. For example, both models may be recurrent neural networks having a relatively large number of layers (e.g., 12 or 24 layers).

At 406, the model compression system generates the labeling model (e.g., the first neural network used in the processing of FIG. 3) based on the proxy model. The model compression system may use the proxy model to construct the labeling model.

In some implementations, constructing the labeling model based on the proxy model may include constructing the labeling model (e.g., first neural network) to include at least a portion of the proxy model (e.g., third neural network). For example, the proxy model may be fine-tuned to perform a specific natural language processing task. For instance, for a proxy model that is a neural network, the model compression system may replace the input and output layers to suit the task to be performed. As a specific example, the proxy model may be adapted to accept, as input, embeddings representing utterances, and to return, as output, values of interest for natural language processing, such as logical forms, named entity types, sentiments, part of speech types, and so forth. The fine-tuning may be completed by training the proxy model using labeled training data as described at blocks 302 and 304 of FIG. 3.

In some implementations, the proxy model is a component of the labeling model. For example, the proxy model may be modified to output the appropriate type of value as described above. This model is then combined with one or more additional sub-models trained to perform an equivalent natural language processing task. For example, two named entity recognizers may be constructed, or four semantic parser models may be constructed, and so forth. The models may then be combined using a suitable technique such as ensemble learning (see, e.g., Zhou et al., *Ensembling Neural Networks: Many Could Be Better Than All*, Artificial Intelligence, vol. 137, pp. 239-263 (2002)) or Siamese neural networks (see, e.g., Bromley et al., *Signature Verification using a "Siamese" Time Delay Neural Network* (1994)).

Alternatively, or additionally, the proxy model may be used as a component of the labelling model without modifying the output of the proxy model. This approach can be useful for using the proxy model to accomplish a different task than the labelling model. For example, the proxy model may be a language model that predicts the next word in the input, and work as a component of the labelling model, which may be a semantic parser that translates user requests to logical forms. For instance, a predictive component can be used to speed the semantic parsing performed by the labelling model.

The use of an initial pre-trained initial model can improve the accuracy of the predictions made by the labeling model because it enables the labeling model to generalise from the task-specific training data in a more reliable fashion. For example, the labeling model may generalize appropriately to words that did not appear in the task-specific training data because those words appeared in the large amount of training data used in pre-training the initial model. However, because the labeling model incorporates the initial model, and high-performance pre-trained models can be very large and have high computational and memory requirements, the labeling model can also have high computational and memory requirements. Accordingly, a smaller NLU model may be generated using data labeled by the labeling model, as described above with respect to FIG. 3.

The techniques described herein have multiple advantages. Natural language understanding models are often so large that they require multiple servers to execute. In some cases it is desirable to embed NLU functionality into a personal device such as a clock radio or smart watch, in which case the model must be much smaller. The compression techniques described herein can be used to reduce NLU models to a size suitable for executing on such embedded systems. Even for NLU tasks running in the cloud, it is desirable to reduce memory usage and computational requirements, which can be achieved using these techniques. The techniques described herein can start with an extremely large pre-trained model with a great deal of language knowledge, and impart this knowledge on the small compressed model, creating great savings in memory and storage requirements, as well as the time to execute the model, without sacrificing accuracy.

The infrastructure described above can be implemented in various different environments including a cloud environment (could be various types of clouds including private, public, and hybrid cloud environments), on-premises environment, a hybrid environment, and the like.

Figure 5:
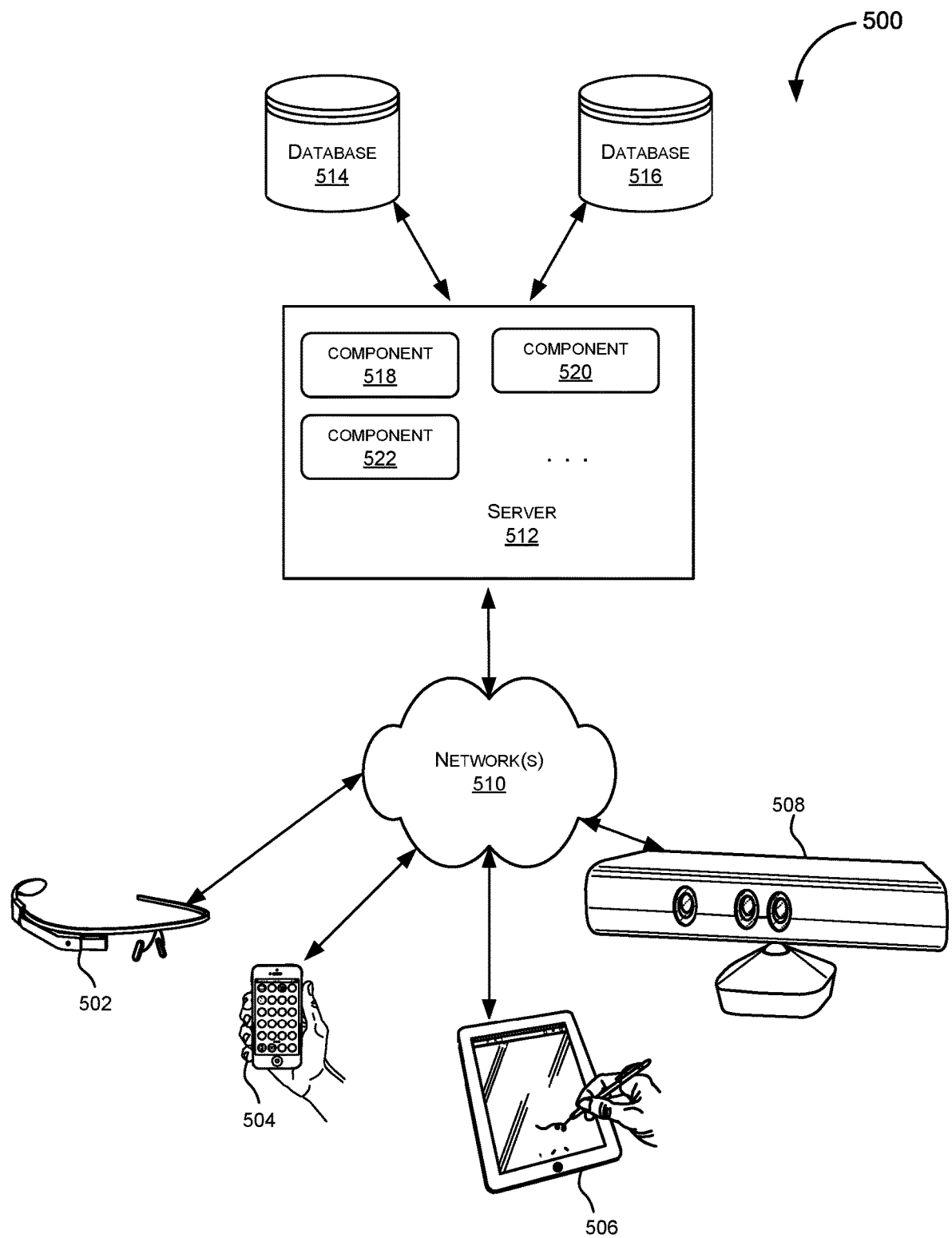
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable streamlined recognition of intent from speech input.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to compress neural networks for use in NLU in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information used to train a model used for NLU. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
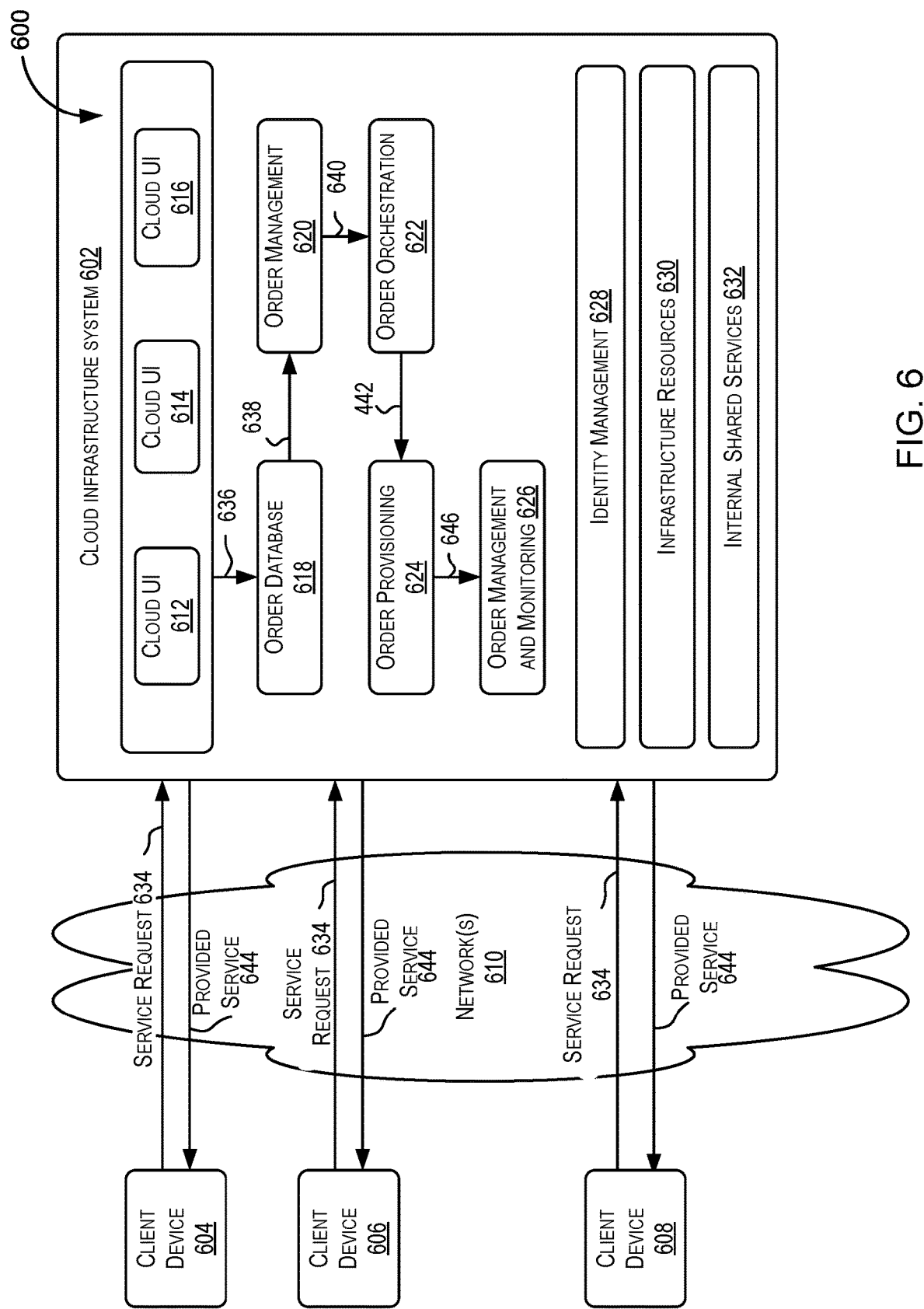
FIG. 6 is a simplified block diagram of a cloud-based system environment in which various storage-related services may be offered as cloud services, in accordance with certain embodiments.

In certain embodiments, the NLU-related functionalities described in this disclosure may be offered as services via a cloud environment. FIG. 6 is a simplified block diagram of a cloud-based system environment in which various NLU-related services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, cloud infrastructure system 602 trains a set of models for an NLU related task. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a NLU-related service described in this disclosure.

In some embodiments, the processing performed by cloud infrastructure system 602 for providing NLU-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for identifying an intent based on received speech input. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a NLU-related service offered by cloud infrastructure system 602. As part of the order, the customer may provide speech input identifying a request.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting the NLU-related service, the response may include a response generated based on an identified intent.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
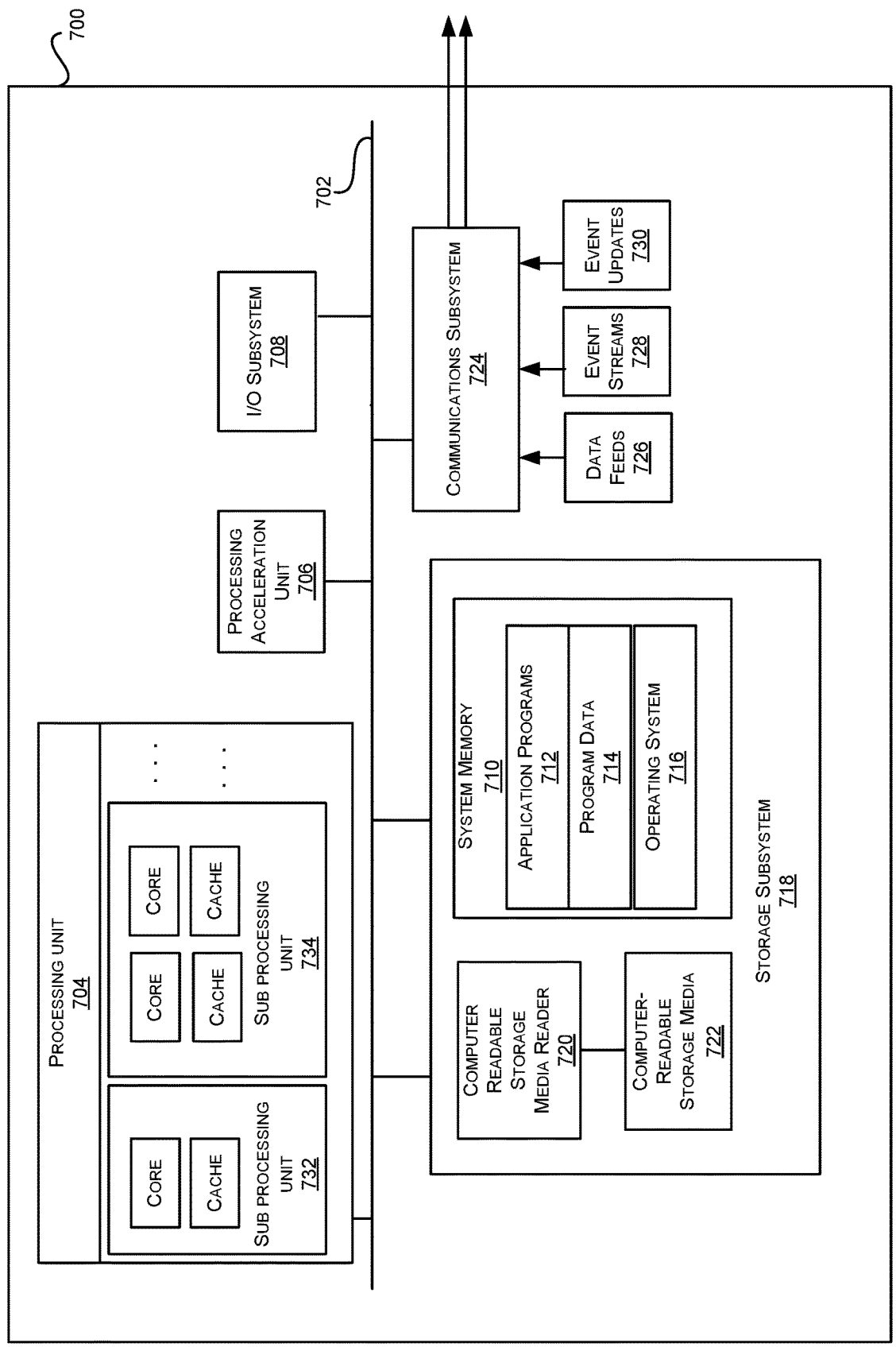
FIG. 7 illustrates an exemplary computer system that may be used to implement certain embodiments.

FIG. 7 illustrates an exemplary computer system 700 that may be used to implement certain embodiments. For example, in some embodiments, computer system 700 may be used to implement any of the ASR subsystem, NLU subsystem, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to communicate with a database to import updated training data for the ASR and/or NLU subsystems.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
   obtaining first labeled conversational data comprising conversation logs annotated with data specific to a conversational task, the conversational task comprising intent determination, named entity recognition, or semantic parsing;
   obtaining second unlabeled conversational data comprising data from a plurality of websites;
   training a third neural network to perform a proxy task using the second unlabeled conversational data, wherein the proxy task comprises a predictive language task, and wherein the third neural network comprises a large language model;
   generating a first neural network based on the third neural network, wherein generating the first neural network based on the third neural network comprises constructing the first neural network to include a portion of the third neural network, with one or more layers of the third neural network replaced with new layers;
   training the first neural network using the first labeled conversational data;
   obtaining first unlabeled conversational data comprising one or more of call logs or text chat logs;
   executing the trained first neural network on the first unlabeled conversational data to generate one or more labels as output of an output layer of the first neural network and label the first unlabeled conversational data with the one or more labels, wherein executing the trained first neural network to generate the one or more labels comprises performing a natural language understanding task to output each label, of the one or more labels, the natural language understanding task comprising intent determination, named entity recognition, or semantic parsing, thereby generating second labeled conversational data; and
   training a second neural network for performing the natural language understanding task using the second labeled conversational data.

2. The method of claim 1, wherein training the second neural network comprises:
   for a first training input, of the second labeled conversational data, outputting by the second neural network a predicted output;
   computing a loss measuring an error between the predicted output and a first label associated with the first training input;
   computing, based upon the loss, updated values for a first set of parameters of the second neural network; and
   updating the second neural network by changing values of the first set of parameters to the updated values.

3. A non-transitory computer-readable memory storing a plurality of instructions executable by one or more processors, the plurality of instructions comprising instructions that when executed by the one or more processors cause the one or more processors to perform processing comprising:
   obtaining first labeled conversational data comprising conversation logs annotated with data specific to a conversational task, the conversational task comprising intent determination, named entity recognition, or semantic parsing;
   obtaining second unlabeled conversational data comprising data from a plurality of websites;
   training a third neural network to perform a proxy task using the second unlabeled conversational data, wherein the proxy task comprises a predictive language task, and wherein the third neural network comprises a large language model;
   generating a first neural network based on the third neural network, wherein generating the first neural network based on the third neural network comprises constructing the first neural network to include a portion of the third neural network, with one or more layers of the third neural network replaced with new layers;
   training the first neural network using the first labeled conversational data;
   obtaining first unlabeled conversational data comprising one or more of call logs or text chat logs;
   executing the trained first neural network on the first unlabeled conversational data to generate one or more labels as output of an output layer of the first neural network and label the first unlabeled conversational data with the one or more labels, wherein executing the trained first neural network to generate the one or more labels comprises performing a natural language understanding task to output each label, of the one or more labels, the natural language understanding task comprising intent determination, named entity recognition, or semantic parsing, thereby generating second labeled conversational data; and training a second neural network for performing the natural language understanding task using the second labeled conversational data.

4. The non-transitory computer-readable memory of claim 3, wherein training the second neural network comprises:
for a first training input, of the second labeled conversational data, outputting by the second neural network a predicted output;
computing a loss measuring an error between the predicted output and a first label associated with the first training input;
computing, based upon the loss, updated values for a first set of parameters of the second neural network; and
updating the second neural network by changing values of the first set of parameters to the updated values.

5. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
obtaining first labeled conversational data comprising conversation logs annotated with data specific to a conversational task, the conversational task comprising intent determination, named entity recognition, or semantic parsing;
obtaining second unlabeled conversational data comprising data from a plurality of websites;
training a third neural network to perform a proxy task using the second unlabeled conversational data, wherein the proxy task comprises a predictive language task, and wherein the third neural network comprises a large language model;
generating a first neural network based on the third neural network, wherein generating the first neural network based on the third neural network comprises constructing the first neural network to include a portion of the third neural network, with one or more layers of the third neural network replaced with new layers;
training the first neural network using the first labeled conversational data;
obtaining first unlabeled conversational data comprising one or more of call logs or text chat logs;
executing the trained first neural network on the first unlabeled conversational data to generate one or more labels as output of an output layer of the first neural network and label the first unlabeled conversational data with the one or more labels, wherein executing the trained first neural network to generate the one or more labels comprises performing a natural language understanding task to output each label, of the one or more labels, the natural language understanding task comprising intent determination, named entity recognition, or semantic parsing, thereby generating second labeled conversational data; and
training a second neural network for performing the natural language understanding task using the second labeled conversational data.

6. The system of claim 5, wherein training the second neural network comprises:
for a first training input, of the second labeled conversational data, outputting by the second neural network a predicted output;
computing a loss measuring an error between the predicted output and a first label associated with the first training input;
computing, based upon the loss, updated values for a first set of parameters of the second neural network; and
updating the second neural network by changing values of the first set of parameters to the updated values.

7. The method of claim 1, wherein the first neural network is a recurrent neural network having 12 or 24 layers.

8. The method of claim 7, wherein the second neural network is a recurrent neural network having 2 or 4 layers.

9. The method of claim 1, wherein the first neural network is trained to perform the natural language understanding task.

10. The non-transitory computer-readable memory of claim 3, wherein the first neural network is a recurrent neural network having 12 or more layers.

11. The non-transitory computer-readable memory of claim 10, wherein the second neural network is a recurrent neural network having 2 or 4 layers.

12. The non-transitory computer-readable memory of claim 3, wherein the first neural network is trained to perform the natural language understanding task.

13. The system of claim 5, wherein the first neural network is a recurrent neural network having 12 or 24 layers.

14. The system of claim 13, wherein the second neural network is a recurrent neural network having 2 or 4 layers.

15. The system of claim 5, wherein the first neural network is trained to perform the natural language understanding task.

* * * * *